(12) United States Patent
Goda et al.

(10) Patent No.: US 12,136,148 B2
(45) Date of Patent: Nov. 5, 2024

(54) METHOD, SYSTEM, DEVICE, AND PROGRAM FOR DISPLAYING PROBABILISTIC CLASSIFICATION RESULTS

(71) Applicant: K.K. CYBO, Tokyo (JP)

(72) Inventors: Keisuke Goda, Tokyo (JP); Nao Nitta, Tokyo (JP); Takeaki Sugimura, Yokohama (JP)

(73) Assignee: K.K. CYBO, Tokyo (JP)

( * ) Notice: Subject to any disclaimer, the term of this patent is extended or adjusted under 35 U.S.C. 154(b) by 875 days.

(21) Appl. No.: 15/733,808

(22) PCT Filed: Jun. 17, 2019

(86) PCT No.: PCT/JP2019/023833
§ 371 (c)(1),
(2) Date: Nov. 30, 2020

(87) PCT Pub. No.: WO2020/004101
PCT Pub. Date: Jan. 2, 2020

(65) Prior Publication Data
US 2021/0232869 A1  Jul. 29, 2021

(30) Foreign Application Priority Data

Jun. 27, 2018  (JP) ................................ 2018-122096

(51) Int. Cl.
*G06T 11/20* (2006.01)
*G06F 18/20* (2023.01)
(Continued)

(52) U.S. Cl.
CPC .......... *G06T 11/206* (2013.01); *G06F 18/214* (2023.01); *G06F 18/2415* (2023.01);
(Continued)

(58) Field of Classification Search
None
See application file for complete search history.

(56) References Cited

U.S. PATENT DOCUMENTS

| 6,947,586 B2 * | 9/2005 | Kasdan | G01N 15/1475 |
| | | | 382/156 |
| 9,582,490 B2 * | 2/2017 | Simard | G06F 40/30 |

(Continued)

FOREIGN PATENT DOCUMENTS

| WO | 2010/076882 A1 | 7/2010 |
| WO | 2013/147114 A1 | 10/2013 |

(Continued)

OTHER PUBLICATIONS

International Search Report for International Application No. PCT/JP2019/023833 dated Sep. 10, 2019, Japan, 1 page.

(Continued)

*Primary Examiner* — Maikhanh Nguyen
(74) *Attorney, Agent, or Firm* — United IP Counselors, LLC

(57) ABSTRACT

A display method, system, device, and related computer programs can present the classification performance of an artificial neural network in a form interpretable by humans. In these methods, systems, devices, and programs, a probability calculator (i.e., a classifier) based on an artificial neural network calculates a classification result for an input image in the form of a probability. The distribution of classification-result probabilities are displayed using at least one display axis of a graph as a probability axis.

11 Claims, 18 Drawing Sheets

(51) Int. Cl.
- *G06F 18/214* (2023.01)
- *G06F 18/2415* (2023.01)
- *G06F 18/2431* (2023.01)
- *G06N 3/08* (2023.01)
- *G06V 10/764* (2022.01)
- *G06V 10/82* (2022.01)
- *G06V 20/69* (2022.01)

(52) U.S. Cl.
CPC .......... *G06F 18/2431* (2023.01); *G06F 18/29* (2023.01); *G06N 3/08* (2013.01); *G06V 10/764* (2022.01); *G06V 10/82* (2022.01); *G06V 20/698* (2022.01)

(56) References Cited

U.S. PATENT DOCUMENTS

| | | | | |
|---|---|---|---|---|
| 9,886,669 | B2* | 2/2018 | Amershi | G06F 18/40 |
| 10,460,256 | B2* | 10/2019 | Amershi | G06T 11/206 |
| 2008/0058221 | A1* | 3/2008 | Terskikh | G01N 33/5073 506/10 |
| 2008/0118161 | A1 | 5/2008 | Liu et al. | |
| 2008/0208015 | A1* | 8/2008 | Morris | A61B 5/165 600/301 |
| 2011/0274362 | A1 | 11/2011 | Isomae et al. | |
| 2015/0132766 | A1 | 5/2015 | Yasuda et al. | |
| 2018/0060722 | A1 | 3/2018 | Hwang et al. | |
| 2018/0182481 | A1* | 6/2018 | Wakasugi | G06V 10/464 |
| 2018/0254106 | A1 | 9/2018 | Mori et al. | |
| 2019/0005666 | A1* | 1/2019 | Nakagawa | G06T 7/00 |
| 2019/0228527 | A1 | 7/2019 | Ramirez et al. | |
| 2019/0302000 | A1 | 10/2019 | Lo et al. | |
| 2022/0011216 | A1 | 1/2022 | Lo et al. | |
| 2022/0335609 | A1 | 10/2022 | Ramirez et al. | |

FOREIGN PATENT DOCUMENTS

| | | |
|---|---|---|
| WO | 2017/072854 A1 | 5/2017 |
| WO | 2017/081829 A1 | 5/2017 |
| WO | 2017/214572 A1 | 12/2017 |
| WO | 2018/039216 A1 | 3/2018 |

OTHER PUBLICATIONS

The First Examination Report of corresponding Indian application No. 202017054771 dated Aug. 23, 2022, Chennai India, 6 pages.
Alsallakh Bilal et al: "Visual Methods for Analyzing Probabilistic Classification Data", IEEE Transactions on Visualization and Computer Graphics, IEEE, USA, vol. 20, No. 12, Dec. 31, 2014, pp. 1703-1712, XP011563312, ISSN: 1077-2626, DOI: 10.1109/TVCG.2014.2346660.
The extended European search report of corresponding European application No. 19824977.3 dated Feb. 22, 2022, Munich Germany, 7 pages.

* cited by examiner

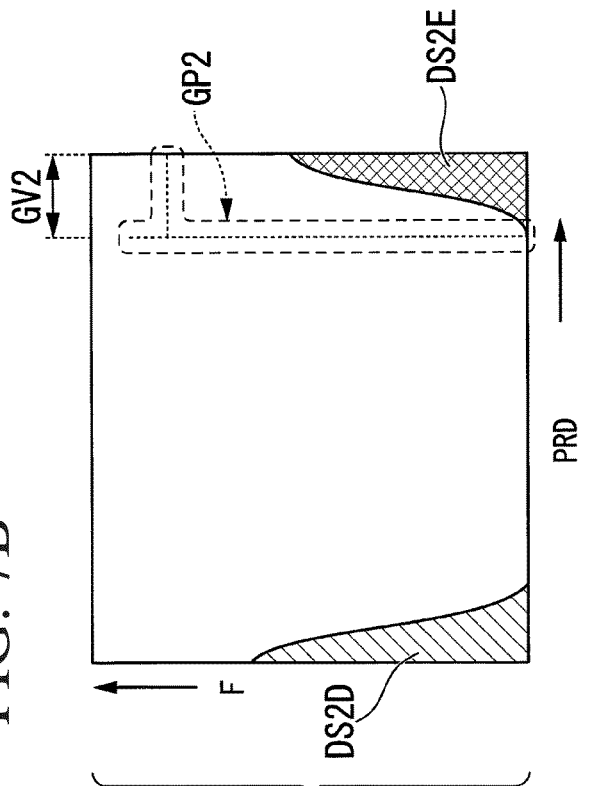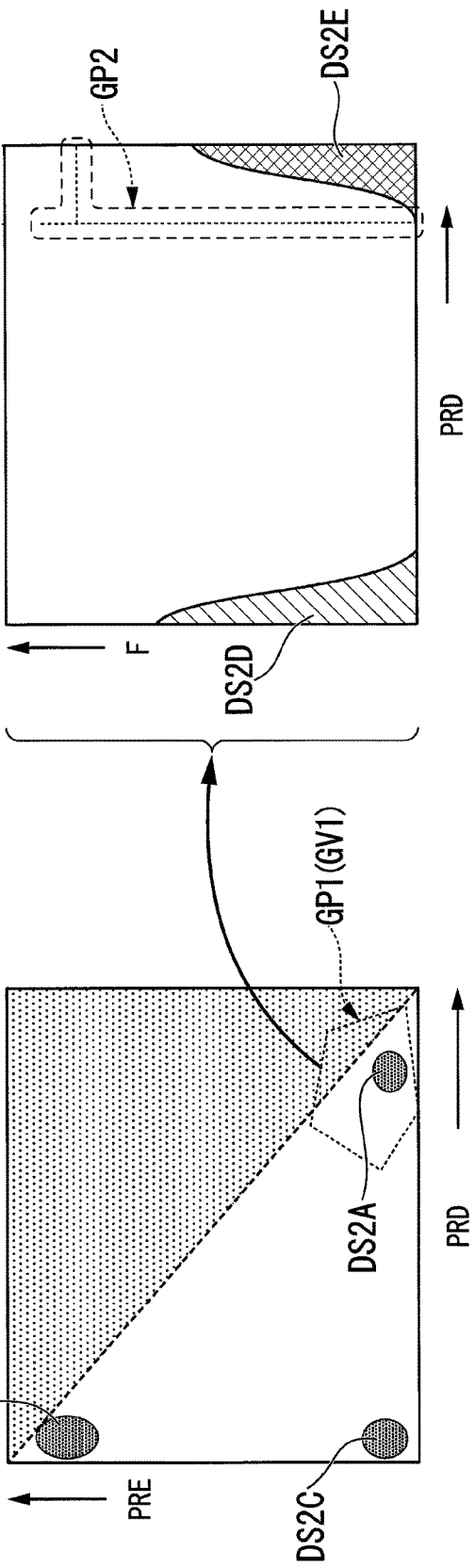

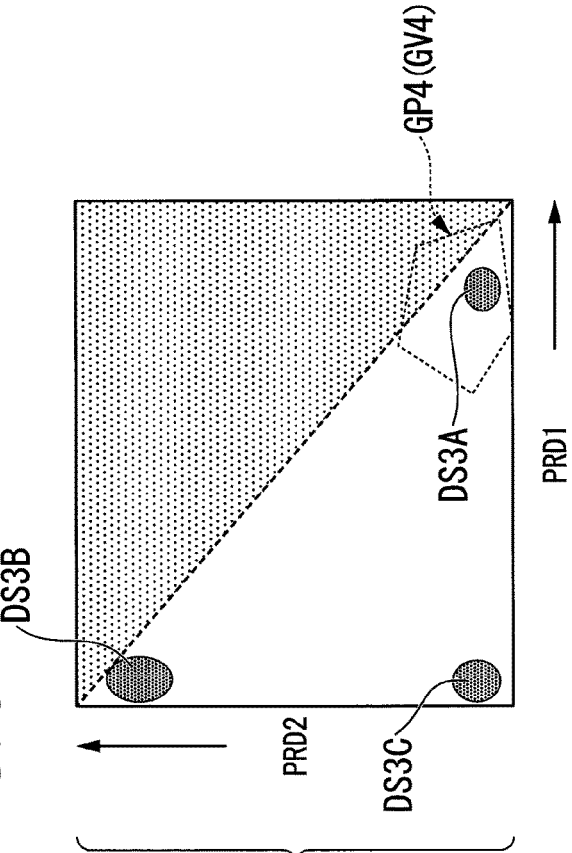
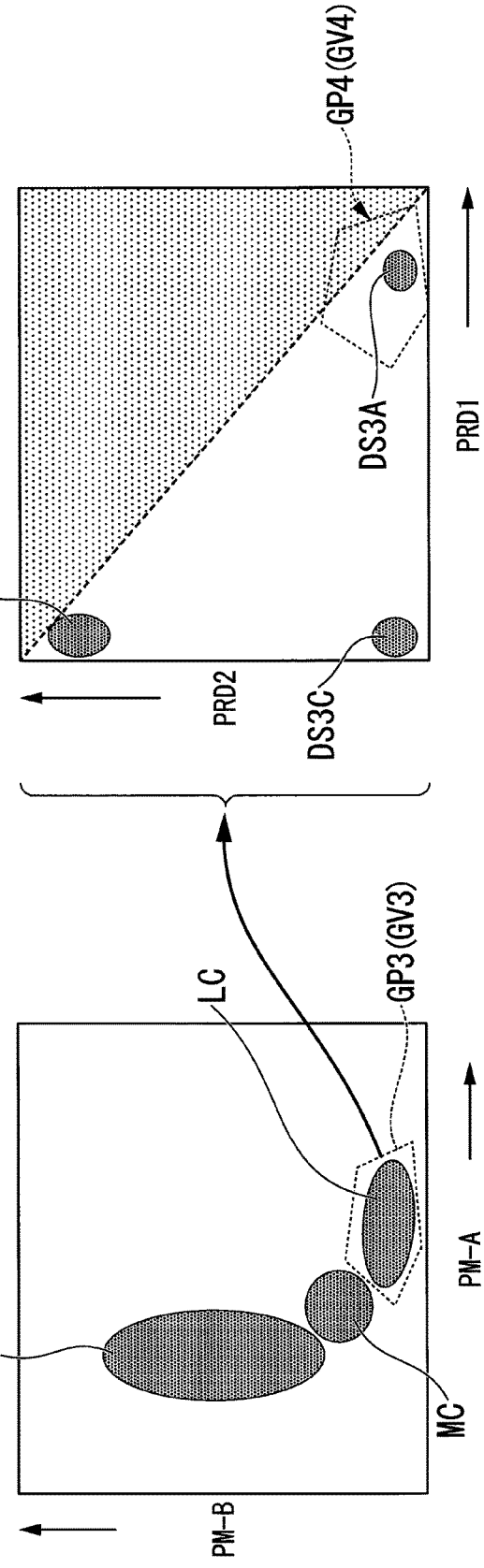

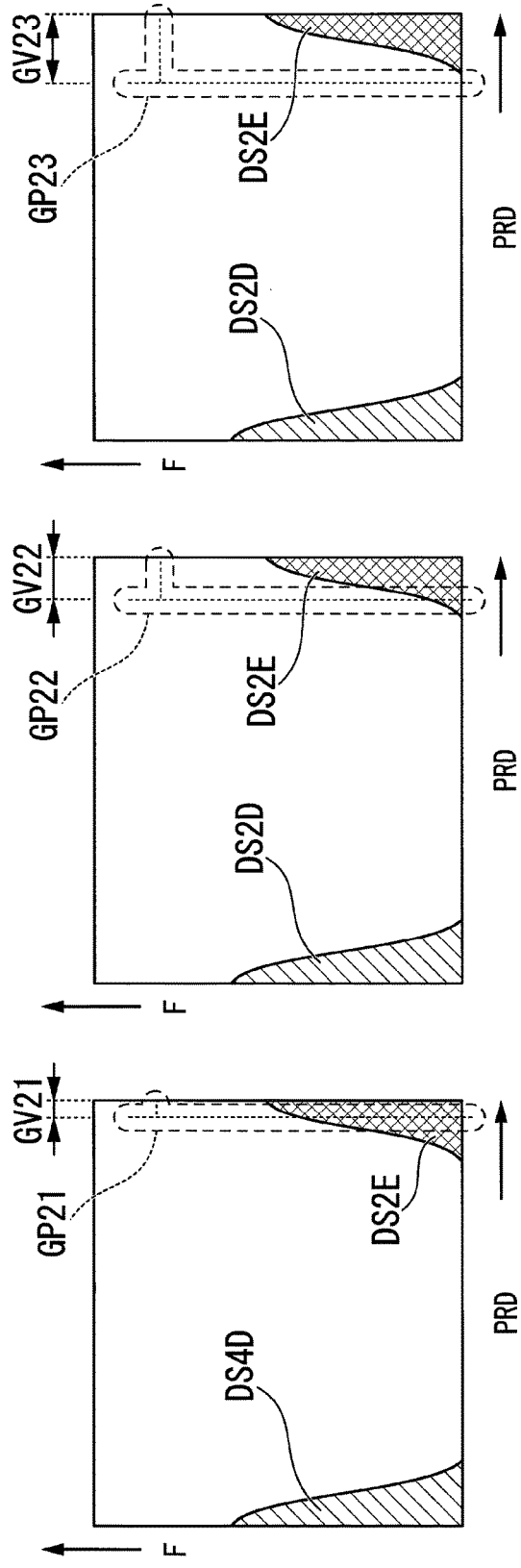

aggregate > 0.999 aggregate 0.99~0.999 aggregate 0.98~0.99

METHOD, SYSTEM, DEVICE, AND PROGRAM FOR DISPLAYING PROBABILISTIC CLASSIFICATION RESULTS

CROSS-REFERENCE TO RELATED APPLICATIONS

This application is a National Stage Entry application of PCT International Application No. PCT/JP2019/023833, filed on Jun. 17, 2019, which claims the priority benefit of Japanese Patent Application No. 2018-122096, filed on Jun. 27, 2018, the entire contents of both of which are hereby incorporated by reference.

BACKGROUND

1. Technical Field

The present invention relates to a method, a system, a device, and a program for displaying probabilistic classification results.

2. DESCRIPTION OF THE BACKGROUND

Known techniques relate to a flow cytometer that classifies the cells by cell type, or to a cell sorter that sorts cells by cell type, as those which identify the type of cells sequentially flowing through a channel with image processing (e.g., Re-publication of PCT International Patent Publication No. 13-147114).

BRIEF SUMMARY

To identify the types of cells, such known techniques may use classification results obtained with machine learning methods such as deep learning based on artificial neural networks. However, the meaning of classification conditions, such as weighting in the internal hierarchy of the artificial neural networks, may not be readily interpretable by humans. With the classification conditions of the artificial neural network less interpretable by humans, the classification performance of the artificial neural network cannot be evaluated with such known techniques.

One or more aspects of the present invention are directed to a display control device, a display control method, and a display control program that present the classification performance of an artificial neural network in a form interpretable by humans.

An aspect of the present invention provides a display control device, including: a probability obtainer configured to obtain a probability of a class classification result of an input image from a probability calculator configured to calculate the probability; and a display controller configured to display a distribution of probabilities obtained by the probability obtainer for input images using at least one of display axes of a graph as a probability axis to indicate the probabilities.

Another aspect of the present invention provides a display control method, including:
obtaining a probability of a classification result of an input image; and
displaying a distribution of probabilities obtained for input images using at least one of display axes of a graph as a probability axis to indicate the probabilities.

Still another aspect of the present invention provides a display control program causing a computer included in a display control device to implement:
obtaining a probability of a classification result of an input image; and
displaying a distribution of probabilities obtained for input images using at least one of display axes of a graph as a probability axis to indicate the probabilities.

The technique according to the present invention can present the classification performance of an artificial neural network in a form easily interpreted by humans.

BRIEF DESCRIPTION OF DRAWINGS

FIGS. 7A and 7B are diagrams illustrating an example of gating performed by a display control device according to the embodiment.

FIGS. 8A and 8B are diagrams showing gating according to a modification performed by the display control device according to the embodiment.

FIGS. 9A to 9C are diagrams showing gating according to another modification performed by the display control device according to the embodiment.

DETAILED DESCRIPTION

A classification system 1 according to an embodiment will be described with reference to the drawings.

Functional Configuration of Classification System 1

Figure 1:
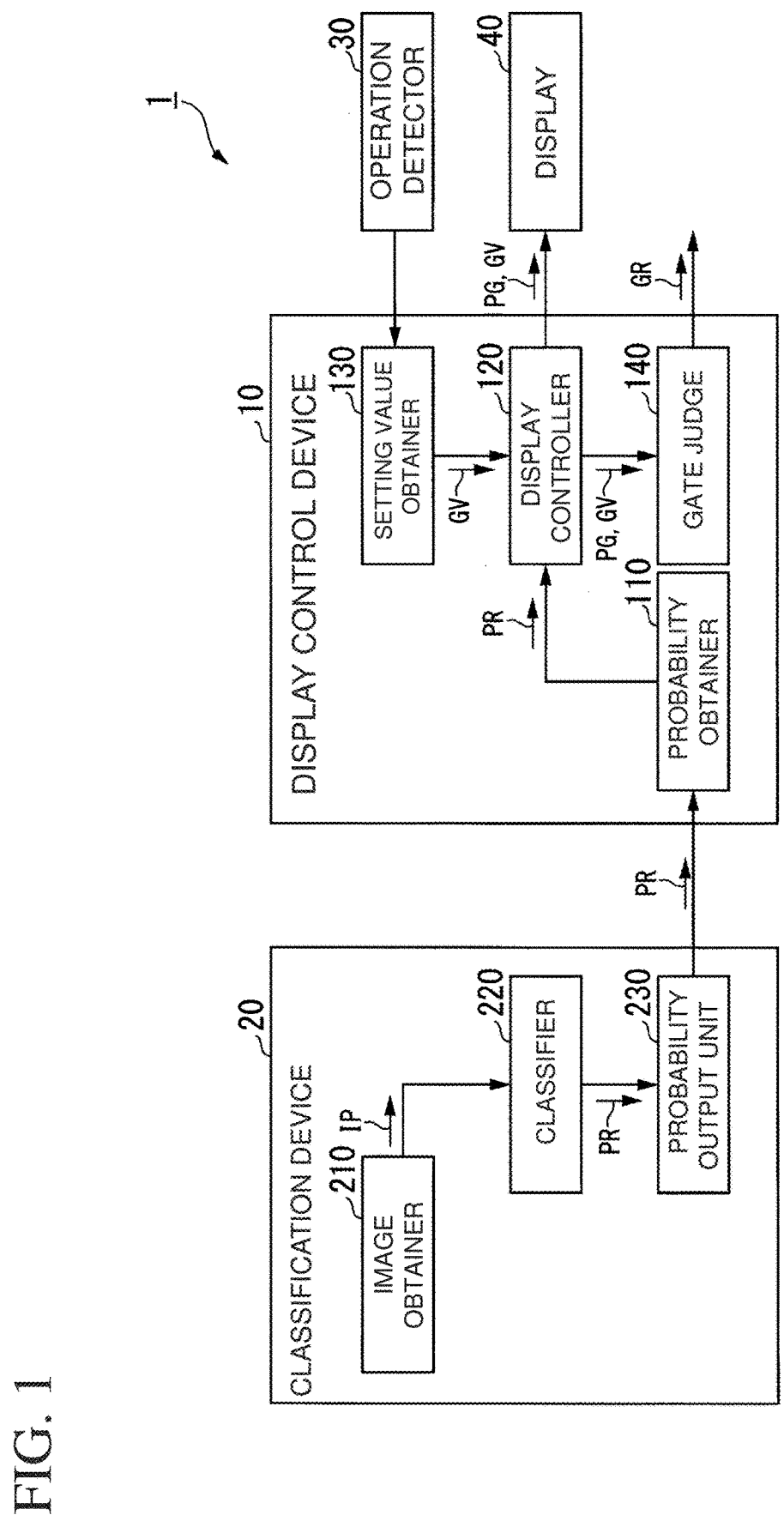
FIG. 1 is a functional block diagram of a classification system according to an embodiment.

FIG. 1 is a functional block diagram of the classification system 1 according to the present embodiment. The classification system 1 may be included in an imaging cytometer (not shown), which is one form of a flow cytometer (FCM) (not shown). The classification system 1 obtains cell images and determines the type of a cell captured in each of the image. A class CL, which is a classification target of the classification system 1, is herein the "cell type". Specifically, the classification system 1 classifies each cell types as a class CL, and also obtains a probability PR (the result of cell type estimation) for each class CL. Furthermore, the probabilities PR obtained from multiple cells for a class CL are displayed on a probability output unit 230. The classification system 1 also sets a gate GT on the probability output unit 230 and determines whether the gate GT includes each obtained image (gating). In a cell sorter with a cell isolation capability, the gating results GR is sent to a sorter (not shown), and the sorting device in the cell sorter sorts cells based on the gating results GR obtained from the classification system 1.

Although the classification system 1 is connected to the cell sorter, is described as an imaging cytometer which determines the types of cells in the embodiments described below, the classification system 1 may have another structure. The classification system 1 may be used for, for example, any applications for cell observation, such as a typical flow cytometer, a mass cytometer, and a microscope, other than the imaging cytometry described above, or for classification of images of any object other than a cell.

The classification system 1 includes a display control device 10 and a classification device 20. The display control device 10 and the classification device 20 may be implemented by a single computer or separate computers.

The classification system 1 includes an operation detector 30 and a display 40.

The operation detector 30 is, for example, an operation device of a computer, such as a keyboard, a mouse, or a touchscreen, and detects the operation of an operator.

The display 40 is, for example, a display device such as a liquid crystal display, and displays an image.

Functional Configuration of Classification Device 20

The classification device 20 includes an image obtainer 210, a classifier 220, and the probability output unit 230.

The image obtainer 210 obtains cell images captured by an imaging unit (not shown) in the cell sorter as input images IP. The image obtainer 210 outputs the obtained input images IP to the classifier 220.

The classifier 220 determines the type of a cell captured in each input image IP as the class CL. The classifier 220 is, for example, implemented as a model learned with a convolutional neural network (CNN) (hereafter also referred to as the neural network CNN).

In one example, the classifier 220 is implemented by the neural network CNN. The classifier 220 may be implemented by, for example, a deep neural network (DNN), a probabilistic neural network (PNN), a feedforward neural network (FFNN), a recurrent neural network (RNN), an autoassociator, a deep belief network (DBN), a radial basis function (RBF) network, a Boltzmann machine, or a restricted Boltzmann machine. These example networks are hereafter also referred to as artificial neural networks.

Figure 2:
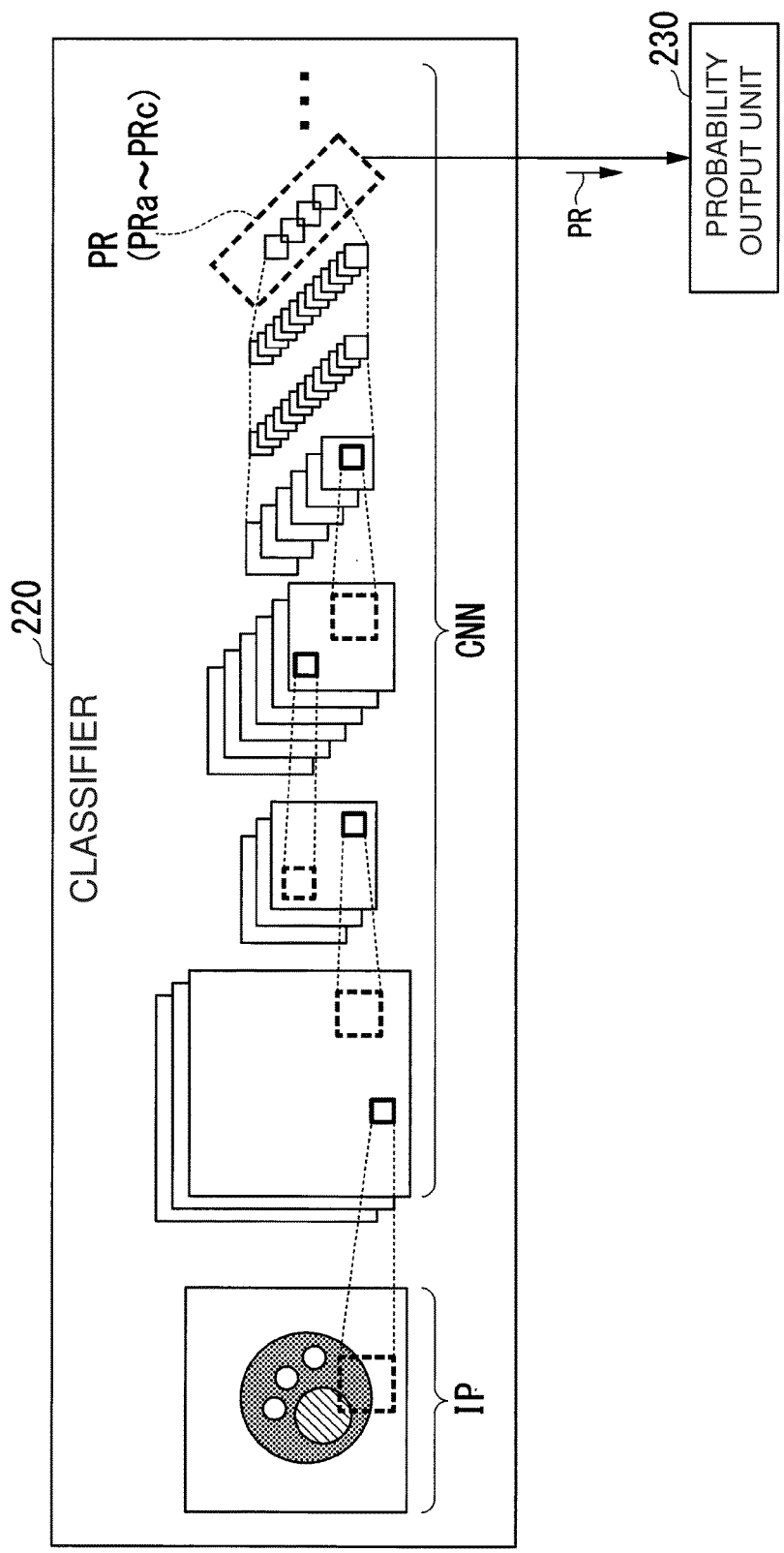
FIG. 2 is a schematic diagram of a classifier according to the embodiment.

FIG. 2 is a schematic diagram of the classifier 220 according to the present embodiment. Each input image IP provided to the classifier 220 includes one of cells (or tissue) such as a platelet aggregate PA, a platelet SP, and a leukocyte LK. In this example, the platelet aggregate PA corresponds to class CLa, the platelet SP to class CLb, and the leukocyte LK to class CLc. The leukocyte LK includes, for example, a granulocyte GL (neutrophil, eosinophil, and basophil), a lymphocyte LC, and a monocyte MC. In an example according to the present embodiment, the lymphocyte LC corresponds to class CLd, a T lymphocyte LC of the lymphocyte LC corresponds to class CLd1, and a B lymphocyte LC of the lymphocyte LC corresponds to CLd2. The granulocyte GL corresponds to class CLe.

In this example, the classifier 220 determines the class CL corresponding to the type of the cell captured in each input image IP from the listed classes CL, and outputs the probability PR for each class CL.

Probability

The classifier 220 outputs a probability for each class CL. The following is an explanation of probability PR. The probability PR corresponds to the each of multiple classes CL in a one-to-one manner. For example, in the case where there are three types of classes CL, class CLa to class CLc, each probability PRa, PRb, and PRc corresponds to class CLa, CLb, and CLc, respectively.

A higher value of probability PR for a class CL indicates that the input signal to CNN (e.g., the input image IP) has a higher likelihood of fitting into the class CL. A lower value of probability PR indicates a lower likelihood that an input signal corresponds to the class CL. For example, the probability PR for the class CLa (class for the platelet aggregate PA in the above example) is high when the input image IP is an image of the platelet aggregate PA, and is low when the input image IP is not an image of the platelet aggregate PA.

The probability PR may be normalized to a predetermined value range (e.g., 0 to 1). In this case, a probability PR for a class CL closer to 1 indicates a higher likelihood that an input signal corresponds to the class CL, and a probability PR closer to 0 indicates a lower likelihood that an input signal corresponds to the class CL. The sum of the probabilities PR for the classes CL is a predetermined value (e.g., 1). When, for example, the input image IP is classified into the above three classes CLa to CLc, the sum of the probabilities PRa to PRc corresponding to these classes is 1.

The above artificial neural network outputs a vector value of the dimension corresponding to the number of classes CL. When, for example, the artificial neural network includes a softmax layer as the last one of the layers, the output value from the last layer could be use as probability PR. The probability PR should be able to express the likelihood that an input signal corresponds to a certain class CL as a relative comparison between the all classes CL. The units of the probability PR are arbitrary.

Figure 3:
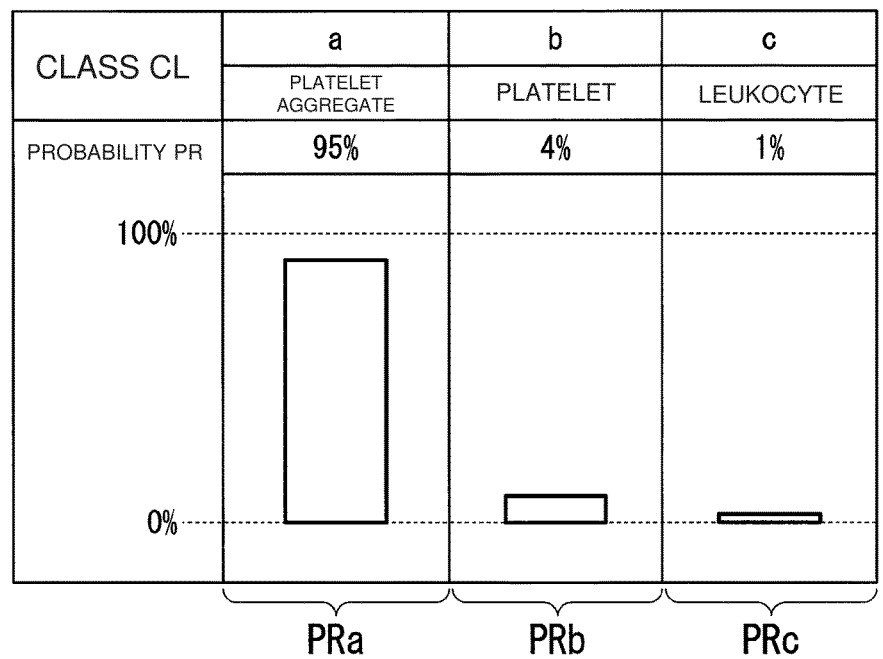
FIG. 3 is a diagram showing example calculation results of probabilities obtained by the classification system according to the embodiment.

FIG. 3 is a diagram showing an example of a result of the calculation of the probabilities PR by the classification system 1 of the present embodiment.

The classifier 220 calculates the probability PR of each class CL for each of the input image IP. For example, when the classification target of images is three classes, CLa, CLb, and CLc, the classifier 220 calculates the likelihood that the input image IP1 falls in classes CLa, CLb. and CLc as the probabilities PRa. PRb, and PRc, respectively. In the example shown in FIG. 3, the classifier 220 calculates the probability PRa as 95%, the probability PRb as 4%, and the probability PRc as 1%.

Then, returning to FIG. 1, the probability output unit 230 outputs the probabilities PR calculated by the classifier 220 to the display control device 10.

Functional Configuration of Display Control Device 10

The display control device 10 includes a probability obtainer 110, a display controller 120, a setting value obtainer 130, and a gate determiner 140.

The probability obtainer 110 obtains the probabilities PR calculated by the classifier 220 (probability calculator) that calculates the probabilities PR of a classification result RCL of each input image IP.

The display controller 120 generates an image of a graph G based on the distribution of the probabilities PR obtained by the probability obtainer 110 for input images IP. The image of the graph G generated by the display controller 120 includes a probability axis PAX as a display axis DAX of the graph G. The display axis DAX refers to an axis of the graph G appearing on the display 40. The probability axis PAX refers to an axis of the graph G indicating the value of the probability PR. The display controller 120 uses at least one of the display axes DAX of the graph G as the probability axis PAX. When, for example, the graph G represents a Cartesian coordinate plane with two axes, X-axis and Y-axis, the class determination system 1 may display X-axis as the probability axis PAX. The display controller 120 may use both the two axes (X-axis and Y-axis) as the probability axes PAX. The graph G is not necessarily biaxial. The graph G may have a number of axes corresponding to the number of the classification target classes CL for the classifier 220. When, for example, the classifier 220 performs classification for three target classes CL, the display controller 120 may display the graph G including three axes. In this case, the classification system 1 may display all the three axes of the graph G as the probability axes PAX.

In summary, the display controller 120 displays the distribution of the probabilities PR for input images IP obtained by the probability obtainer 110, using at least one of the display axes DAX of the graph G as the probability axis PAX to indicate the probabilities PR.

The image of the graph G generated by the display controller 120 is hereafter also referred to as a probability graph image PG.

The setting value obtainer 130 obtains a gating region GV for the probabilities PR on the graph G.

The gate judge 140 determines whether the input image IP is on the inside of the gating region GV, based on the gating region GV obtained by the setting value obtainer 130.

Next, an example of the operation of each of these units is described with reference to FIG. 4.

Operation of Classification System 1

Figure 4:
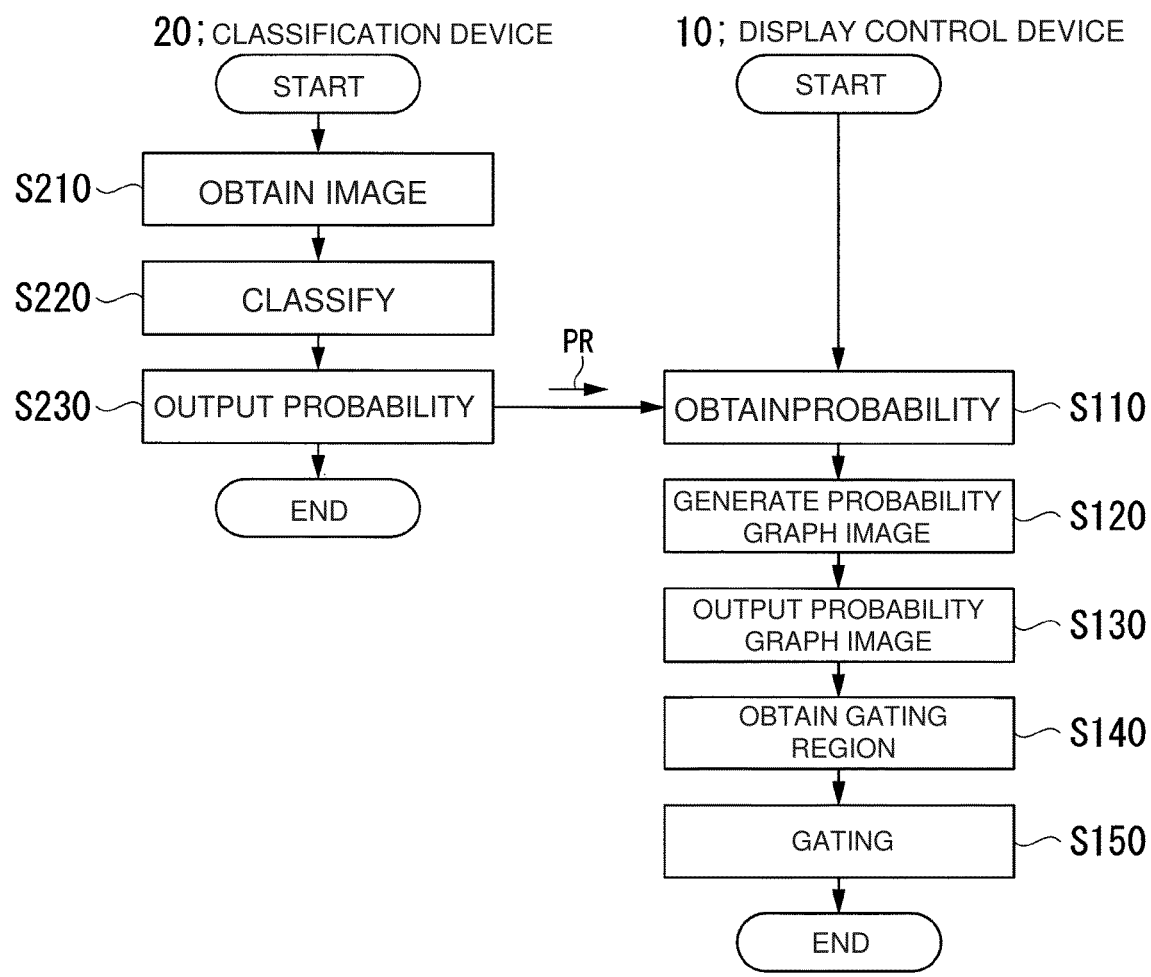
FIG. 4 is a flowchart showing an example operation of the classification system according to the embodiment.

FIG. 4 is a flowchart showing an example of the operation of the classification system 1 according to the present embodiment.

The image obtainer 210 obtains images of cells (or tissues) as the input images IP from a flow cytometer (not shown) (step S210). The image obtainer 210 outputs the obtained input images IP to the classifier 220.

The classifier 220 calculates the probabilities PR for each of the classification target classes CL for the input images IP obtained in step S210 (step S220).

The probability output unit 230 outputs the probabilities PR calculated in step S220 to the display control device 10 (step S230).

The probability obtainer 110 obtains the probabilities PR calculated in step S230 (step S1110).

The display controller 120 generates an image of the graph G based on the probabilities PR obtained in step S110 (step S120).

The display controller 120 outputs the probability graph image PG generated in step S120 to the display 40 (step S130). Thus, the probability graph image PG generated in step S120 appears on the display 40.

The setting value obtainer 130 obtains the gating region GV (step S140). The gating region GV may be provided manually with a keyboard, a mouse, or a touchscreen, for example, or may be automatically calculated based on, for example, the distribution pattern in the probability graph image PG. The setting value obtainer 130 outputs the obtained gating value GV to the display controller 120. The gating region GV is a value used for setting the gate GT on the probability graph image PG displayed in step S130.

The display controller 120 displays a gate image GP corresponding to the obtained gating region GV on the probability graph image PG.

The display controller 120 outputs the probability graph image PG generated in step S130, as well as the gating region GV for the probability graph image PG, to the gate judge 140. The gate judge 140 judges whether the input images IP obtained in step S210 are within the gating region GV generated in step S140, and generates the gating results GR (step S150). Judging whether each input image IP is within the gating region GV refers to determining whether the probability PR of the input image IP is plotted within the part of the probability PR indicated by the gating region GV on the probability graph image PG. In the present embodiment, the gate judge 140 may determine whether the input images IP are within the gating region GV based on the probability graph image PG generated by the display controller 120 in step S140, and the gating region GV on the probability graph image PG.

The gate judge 140 outputs the generated gating results GR to the cell sorter (not shown). The classification system 1 with the above structure may be programmed to selectively sort cells included (or not included) in the gating region GV. Also, the classification system 1 selectively displays data (e.g., images, numerical data, and plots) of cells included (or not included) in the gating region GV based on the gating results GR.

The display controller 120 may display data representing target cells, such as input image IP and graph G, using the gating results GR obtained by the gate judge 140. Based on the gating results GR, the display controller 120 can also calculate and output statistical values such as the number and ratio of the input images IP included in the gate GT, and display the values on the graph G. The display controller 120 can also change color and shape of a point representing each input image data included in the gate GT, based on the gating results GR indicating whether each input image IP is included in the gate GT.

Next, an example of the probability graph image PG generated by the display controller 120 is described with reference to FIGS. 5A to 5C.

Examples of Probability Graph Image PG

Figure 5A:
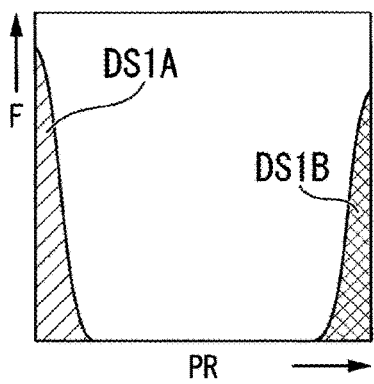
FIGS. 5A to 5C are example probability graph images according to the embodiment.
Figure 5B:
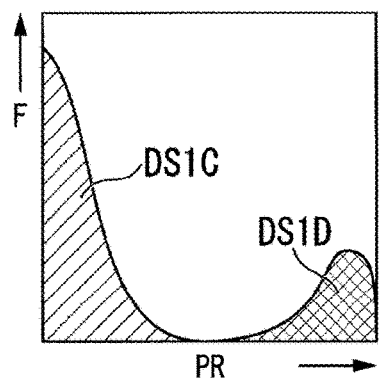
Figure 5C:
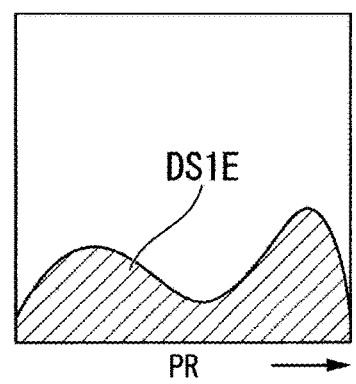

FIGS. 5A to 5C are examples of probability graph images PG according to the present embodiment. As described above, the display controller 120 displays the distribution of the probabilities PR for input images IP using at least one of the display axes DAX of the graph G as the probability axis PAX. As in the example shown in FIG. 5A, the display controller 120 displays the graph G with X-axis being the probability axis PAX and Y-axis indicating the appearance frequency of the probability PR in the display axes DAX of the graph G. The appearance frequency of the probability PR on Y-axis is a value obtained by counting the probabilities PR of the input images IP corresponding to a class CL when the classifier 220 determines the classes CL of the multiple input images IP. The appearance frequency of the probability PR is also referred to as a frequency F of the input images IP at a certain probability PR. In the example shown in FIG. 5A, the probability graph image PG is a histogram with X-axis being the probability axis PAX and Y-axis indicating the frequency F.

In a specific example, the classifier 220 determines whether each input image IP is an image of the platelet aggregate PA. The classifier 220 calculates the probability PRa that the cell (tissue) captured in each input image IP is the platelet aggregate PA. When, for example, an image of the platelet aggregate PA is provided as the input image IP, the classifier 220 calculates the probability PR (probability PRa) that the input image IP is the image of the platelet aggregate PA as 95%. In this case, the classifier 220 determines that the likelihood that the provided input image IP is an image of the platelet aggregate PA is high. When an image of the leukocyte LK is provided as the input image IP, the classifier 220 calculates the probability PRa as 4%. In this case, the classifier 220 determines that the likelihood that the provided input image IP is an image of the platelet aggregate PA is low.

The classifier 220 calculates the probability PRa for each input image IP, and displays the distribution of the calculated probabilities PRa by displaying the graph G, as the probability graph image PG on the display 40, with X-axis being the probability axis PAX and Y-axis indicating the frequency F.

FIGS. 5A to 5C show differences in the classification performance of the classifier 220. When the classification performance is relatively high, the probabilities PR are distributed as shown in FIG. 5A. Thus, when the classification performance is relatively high, the distribution of the probabilities PR is clearly divided into a region with a distribution DS1A having the relatively low probabilities PR and a region with a distribution DS1B having the relatively high probabilities PR. In other words, when the probability graph image PG shown in FIG. 5A appears on the display 40, the operator interprets that the classification performance is relatively high.

When the classification performance is relatively low, the probabilities PR are distributed as shown in FIG. 5B. Thus, although the distribution of the probabilities PR is divided into a region with a distribution DS1C having the relatively low probabilities PR and a region with a distribution DS1D having the relatively high probabilities PR when the classification performance is relatively low, the two regions are closer to each other than in the example shown in FIG. 5A. Thus, when the classification performance is relatively low, the regions with the relatively high and low probabilities PR are not clearly dividable. In other words, when the probability graph image PG shown in FIG. 5B appears on the display 40, the operator interprets that the classification performance is relatively low.

When the classification performance is lower, the probabilities PR are distributed as shown in FIG. 5C. When the classification performance is lower, the distribution of probabilities PR is fused together in a distribution DS1E, and groups with the high and low probabilities PR cannot be separated. In other words, when the probability graph image PG shown in FIG. 5C appears on the display 40, the operator interprets that the classification performance is lower than in the example shown in FIG. 5B.

The classification performance is also referred to as the classification accuracy of the class CL.

As described above, at least one axis of the graph G is the probability axis PAX, and thus the operator (human) can readily interpret the classification performance of the classifier 220. Thus, the classification system 1 according to the present embodiment can present the classification performance for the class CL performed by the neural network CNN in a form interpretable by the operator.

It is generally difficult for humans to interpret the meaning of the weighting at each internal layer in the neural network CNN. Therefore, it is generally difficult for humans to interpret the classification condition used by the neural network CNN to determine the class CL of each input image IP. Therefore, when evaluating whether the learning state of the neural network CNN is appropriate (i.e., the classification performance of the neural network CNN), it is generally difficult by humans to evaluate it by observing the internal state of the neural network CNN. For this reason, conventionally, when evaluating the classification performance of the neural network CNN, the input signals (e.g., input images IP) provided to the neural network CNN and the classification results RCL generated by the neural network CNN based on these input signals are compared to each other to evaluate the classification performance of the neural network CNN. For example, when the neural network CNN receives an input image IP of "platelet aggregate PA" and the classification result RCL of the neural network CNN indicates "platelet aggregate PA", it is determined that the neural network CNN has been reasonably trained. However, this conventional method only determines whether the classification results RCL of the neural network CNN is correct or incorrect, and it is not possible to determine the degree of appropriateness of the classification results RCL. Hence, it is not possible to determine the classification performance of the neural network CNN.

The classification system 1 of the present embodiment outputs the probabilities PR that is used by the neural network CNN for classification and displays the probability PR as a display axis DAX of the graph G. As described above, the probability PR is a value calculated by the neural network CNN as an index of the likelihood that an input signal corresponds to a certain class CL, and thus indicates the degree of appropriateness of the classification by the neural network CNN. Therefore, the distribution of the probabilities PR can be an indicator of the classification performance of the neural network CNN. Here, as described with reference to FIGS. 5A to 5C, by using the distribution of the probabilities PR as the axis of the graph G, the internal state of the neural network CNN can be put in a format that makes it easier for humans to interpret it.

The classification system 1 of the present embodiment can present the classification performance of the neural network CNN in a form that is easy for humans to interpret by showing the distribution of the probabilities PR on the axis of the graph G.

Although the above description was given for the case where a human interprets the classification performance of the neural network CNN, the gate judge 140 may evaluate the classification performance.

Note that the cause of low classification performance, as shown in FIG. 5C, may be the low performance of a model used by the neural network CNN for classification or the low quality of input images. Retraining is an effective way to improve the performance of the neural network CNN.

The examples below describe methods of retraining. For example, when a gate is identified as not valid from the distribution of probabilities for a certain parameter, it is effective to add new images to train the class of the parameter and retrain it.

It is also useful to perform image processing, such as reversing or rotating, on the existing images used for training to generate additional images to be used for retraining.

As shown in FIG. 5C, when regions of high and low probabilities are indistinguishable, it may be apparent that there are several differently shaped cells in a population that was classified into a single class. In such cases, it is effective to split the existing classes and add new ones for retraining.

Retraining may also be effectively performed by integrating two or more existing categories into a single category.

Retraining may also be effectively performed by changing the model (e.g., the number of layers and the configuration for connecting layers) of the classifier.

The above retraining methods may be combined as appropriate to improve the performance of the model of neural network CNN.

The gate judge 140 may determine whether to perform relearning or determine a retraining method based on the evaluation result of the classification performance.

Variation of Display Format

Figure 6:
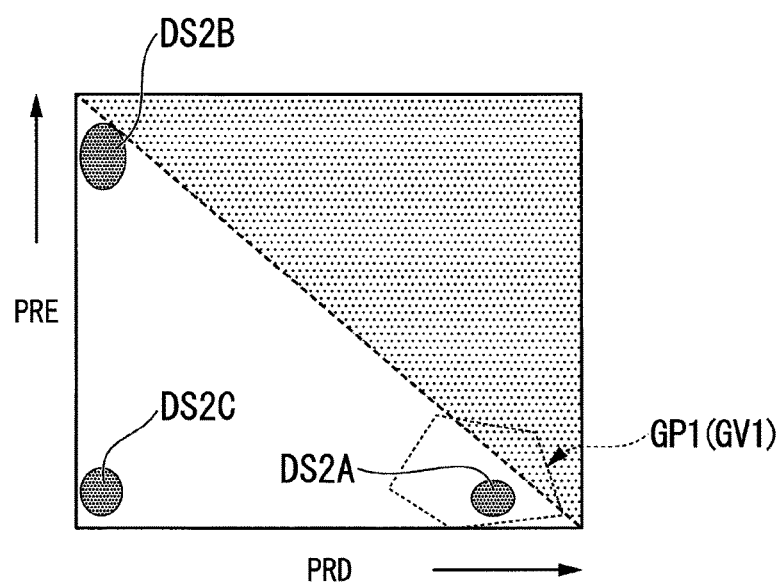
FIG. 6 is an example graph displayed by a display controller according to the embodiment.

FIG. 6 is an example of the graph G displayed by the display controller 120 according to the present embodiment. In the present modification, the display controller 120 displays the probability graph image PG with the display axes DAX of the graph G including X-axis indicating a probability PRd of the class CLd and Y-axis indicating a probability PRe of the class CLe. In the above example, the class CLd corresponds to the lymphocyte LC, and the class CLe corresponds to the granulocyte GL. In this case, a distribution DS2A shows the region where the classifier 220 classifies the input images IP as being images of lymphocyte LC. A distribution DS2B shows the region where the classifier 220 classifies the input images IP as being images of granulocyte GL. A distribution DS2C shows the region where the classifier 220 classifies the input images IP as being images of neither lymphocyte LC nor granulocyte GL.

In the example shown in the figure, the display controller 120 displays the multiple display axes DAX of the graph G as the probability axes PAX.

The classification system 1 can present the classification performance of the neural network CNN in a form easily interpretable by humans by displaying the graph G with the multiple display axes DAX being the probability axes PAX.

In the above examples, it is explained that the probability axis PAX is an axis that represents the probability PR of a class CL as it is, but it is not the only way. The probability axis PAX may be an axis representing the probability PR of multiple classes CL combined together (i.e., a combination probability PRCB). For example, the graph G may have X-axis as a combination probability PRCB wherein the probabilities PRa and PRb are added together with a polynomial. In this example, the combination probability PRCB is obtained by adding a value of the probability PRa multiplied by a weight and a value of the probability PRb multiplied by another weight. In this case, the display controller 120 displays an axis indicating the combination probability PRCB obtained by combining the probabilities PR of the multiple classes CL indicated by the classification results RCL as the probability axis PAX.

The operator inputs the gating region GV to the operation detector 30, and the display control device 10 display the gate image GP superimposed on the graph G. Here, "gate" refers to a region for extracting a specific region from a graph G such as a histogram. Also, "gating" refers to a process of extracting a specific region by setting a gate for graph G.

For example, the gating is effective to extract only the information of a specific type of cell from a graph G.

For example, when the class CL to be gated spans multiple classes CL, it is effective to use the combination probability PRCB described above, where multiple probabilities PR are added together with a polynomial formula.

An example of the gating is described below with reference to FIGS. 7A and 7B.

Example of Gating

FIGS. 7A and 7B are diagrams illustrating an example of gating performed by the display control device 10 according to the present embodiment. FIG. 7A shows the probability graph image PG shown in FIG. 6 again. The display control device 10 displays the probability graph image PG (FIG. 7B) for the population DS2A in the probability graph image PG.

The operator inputs the gating region GV to the operation detector 30. The input of the gating region GV includes, for example, numerical input and shape input such as a rectangle, a circle, or a polygon for the image of the graph G. When detecting the input of the gating region GV, the operation detector 30 outputs information indicating the detected input to the display control device 10.

The setting value obtainer 130 obtains the gating region GV from the information output from the operation detector 30.

The display controller 120 displays, on the graph G, the gate image GP showing the gate GT based on the gating region GV obtained by the setting value obtainer 130.

In the example shown in FIG. 7A, the setting value obtainer 130 obtains a gating region GV1. The display controller 120 displays, on the display 40, a gate image GP1 (polygonal gate image GP) superimposed on the probability graph image PG.

The gate image GP1 shown in FIG. 7A surrounds the region of the distribution DS2A. The distribution DS2A is in a region with relatively high probability PRd for the class CLd (i.e., high likelihoods of the input images IP being images of lymphocyte LC).

When determining that a region surrounded by the gate image GP is a region with a relatively high probability PRd for the class CLd, the display controller 120 generates an image of a new graph G and displays it on the display 40 (FIG. 7B). The graph G shown in FIG. 7B is a probability graph image PG with the X axis being the probability PRd and the Y axis being the frequency F.

In short, the display controller 120 displays the new graph G based on the position of the gate image GP in the display region of the graph G.

In the case of the example of graph G shown in FIG. 7B, it is indicated that the distribution is divided into a population with a relatively low probability PRd of "distribution DS2D" and a region with a relatively high probability PRd of "distribution DS1E". A gate can also be set on the graph G in FIG. 7B.

Specifically, the operator inputs a gating region GV2 to the operation detector 30 to set the gate for the graph G shown in FIG. 7B. In this example, the gating region GV2 is a numerical value indicating a range of the probability PRd. When the operation detector 30 detects the operation of inputting the gating region GV2, it outputs information indicating the detected input to the display control device 10.

The setting value obtainer 130 obtains the gating region GV2 from the operation detector 30.

The display controller 120 displays, on the graph G, the gate image GP2 showing the gate GT based on the gating region GV2 obtained by the setting value obtainer 130. In the example shown in FIG. 7B, the gate image GP2 surrounds a distribution DS2E. The distribution DS2E is a population with a relatively high probability PRd (i.e., the region with a high likelihood that the input images IP are images of lymphocytes LC). It means the lymphocytes LC are gated in the example shown in FIG. 7B.

As described above, the display control device 10 can displays the multiple graphs G in a stepwise manner based on the operations detected by the operation detector 30. In other words, the display control device 10 can visually represents the narrowing of the population by gating regions on the images of the graphs G in a format that is easy for human to interpret.

Variation of Gating (1)

FIGS. 8A and 8B show variant of gating performed by the display control device 10 of the present embodiment. In the example shown in FIGS. 7A and 7B above, the graph G prior to gating (FIG. 7A) is a probability graph image PG. The present variant differs from the example described above in that the graph G prior to gating is not a probability graph image PG.

The graph G shown in FIG. 8A is a distribution chart with an X-axis for parameter PM-A and a Y-axis for parameter PM-B. In one example, the parameter PM-A indicates the degree of reaction of each cell for antibody (e.g., CD45-fluorescein isothiocyanate, or FITC) and the parameter PM-B indicates the degree of scattered light (e.g., side-scattered light) of each cell. The graph G in the figure shows the distributions of granulocytes GL, monocytes MC, and lymphocytes LC. In this example, lymphocytes LC are gated. The operator sets an area of the graph G that covers the region surrounding the region of lymphocytes as a gating region GV3. The operation detector 30 detects the setting operation of the gating region GV3 and outputs it to the display control device 10. The display controller 120 displays a gate image GP3 corresponding to the gating region GV3. The display controller 120 generates an image of the graph G shown in FIG. 8B based on the gating region GV3, and displays the image on the display 40.

The graph G shown in FIG. 8B is a probability graph image PG with X-axis being a probability PRd1 and Y-axis being a probability PRd2. The probability PRd1 is, for example, the probability PR for the class CLd1 (T lymphocyte LCT). The probability PRd2 is, for example, the probability PR for the class CLd2 (B lymphocyte LCB). The graph G shown in the figure includes regions with a relatively high likelihood of being a T lymphocyte LCT (distribution DS3A), a relatively high likelihood of being a B lymphocyte LCB (distribution DS3B), and a relatively low likelihood of both (distribution DS3C).

The graph G can also be gated by a gating region GV4 and a gate image GP4.

Variation of Gating (2)

FIGS. 9A to 9C shows another variant of gating performed by the display control device 10 of the present embodiment. In this variant, as in the example of FIG. 7B described above, gating can be performed by the gating region GV. The present variant differs from the example described above in that the gating region GV is changeable depending on the purpose of gating. Here, as an example of a purpose of gating, there is a screening. In the screening, when more false positive cells can be obtained to avoid dropping the positives, the gating region GV is set wider (e.g., the gating region GV23 shown in FIG. 9C). Conversely, when it is acceptable for some positive cells to be dropped to minimize false positive cells, the gating region GV is set narrower (e.g., the gating region GV21 shown in FIG. 9A).

In the above embodiments, the case of imaging cytometry as a classification system 1 is described, however, when multiple cells are present in a single image, as in the case of using a microscope, individual cell images may first be cropped from a whole image and the cropped images may be provided to the classification system 1.

The classification system 1 may be combined with a microscope for capturing a three-dimensional structure of an object, such as a confocal microscope or a two-photon microscope. Besides the depth direction (Z direction), the classification system 1 may also be combined with a microscope for various types of multidimensional imaging, such as time-lapse imaging and multi-wavelength imaging. For the multidimensional images obtained from such multidimensional imaging, images of individual cell can also be cropped out and provided to the classification system 1.

When the classification system 1 is used in combination with a microscope that can perform multidimensional imaging in three or more dimensions, the following methods can be used to apply the multidimensional image data to the present invention.

The first method is to perform inter-image calculations (e.g., simple addition, deconvolution, and maximum value per pixel) on multiple images with different positions in the depth direction (Z direction) and combine them into a single image. The classification system 1 then obtains the probability of the single image and perform classification on the image.

The second method is to convert multiple images with different positions in the depth direction (Z direction) into a single voxel image including the Z direction, and then obtaining the probability of the voxel image to perform classification.

In the third method, a plurality of images in different positions in the depth direction (Z direction) are individually input to the classification system 1, and a probability is obtained for each Z position.

The first and second methods produce a set of probabilities for a single cell. On the other hand, the third method provides a probability for each Z position. Therefore, in the third method, the image at an optimum Z position can also be selected based on the distribution of the probability.

While the multidimensional images in the depth direction (Z direction) are described in the above examples, the same can be done for multidimensional images with multiple time points or multiple wavelengths.

The display controller 120 may map and display the probabilities of a multidimensional image obtained through multidimensional imaging with an original multidimensional image. The mapping refers to displaying the distribution of probabilities on an original multidimensional image using, for example, a contour plot, a heat map, a dot plot, or a bar graph.

The display controller 120 may have the cells of the gated class mapped onto the original multidimensional image. For example, the positions of the cells of the gated class may be represented on the original multidimensional image as dots, or a region including the cells of the gated class may be surrounded by a curved line or represented with a different color tone. The above display methods allow the classification results of cell images having a time or spatial distribution to be more easily interpreted by humans.

EXAMPLES

With reference FIGS. 10 to 18C, examples of the classification system 1 according to the present embodiment will be described.

Figure 10:
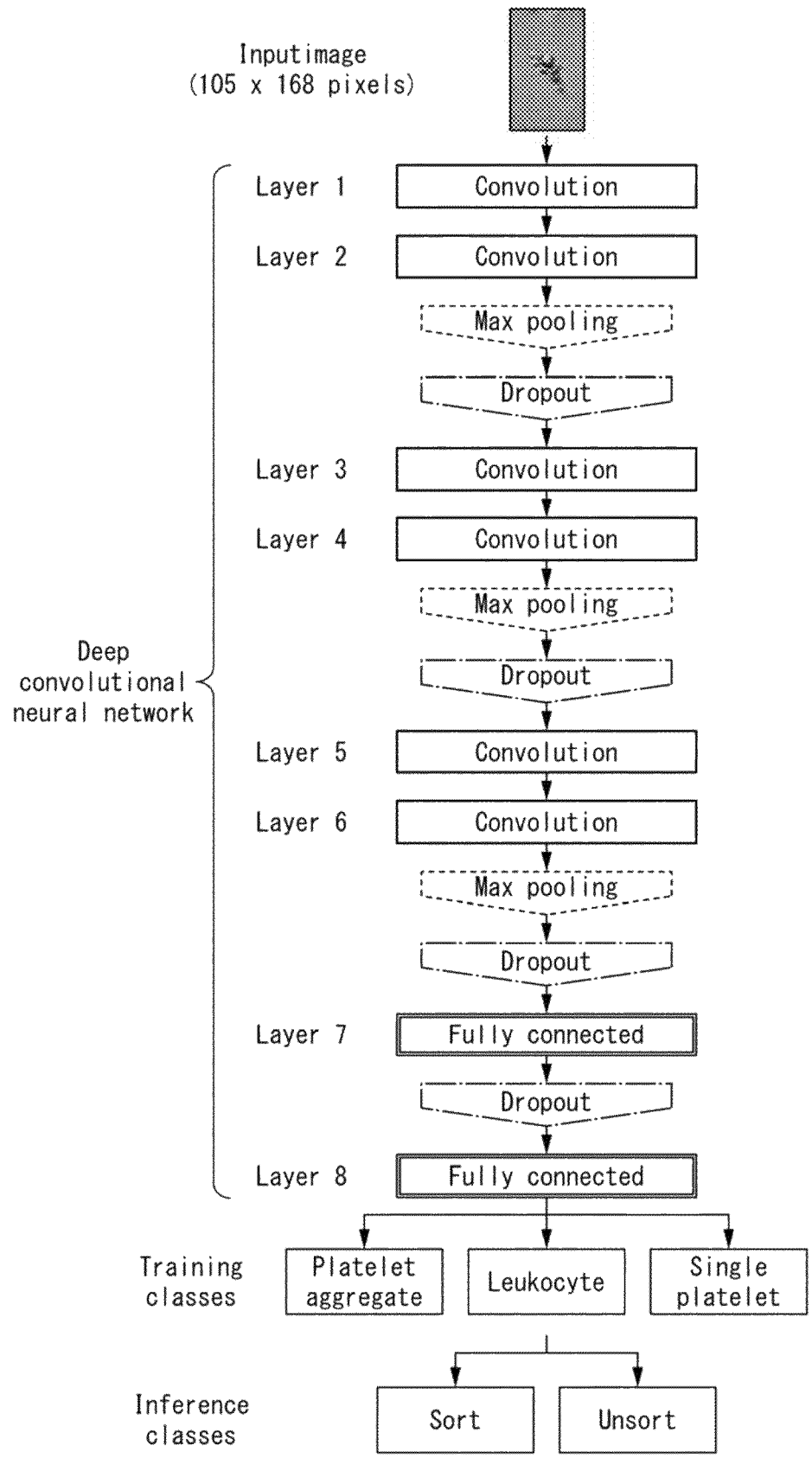
FIG. 10 is a schematic diagram of a neural network according to the embodiment.

FIG. 10 is an example of the configuration of the neural network CNN according to the present embodiment.

Figure 11:
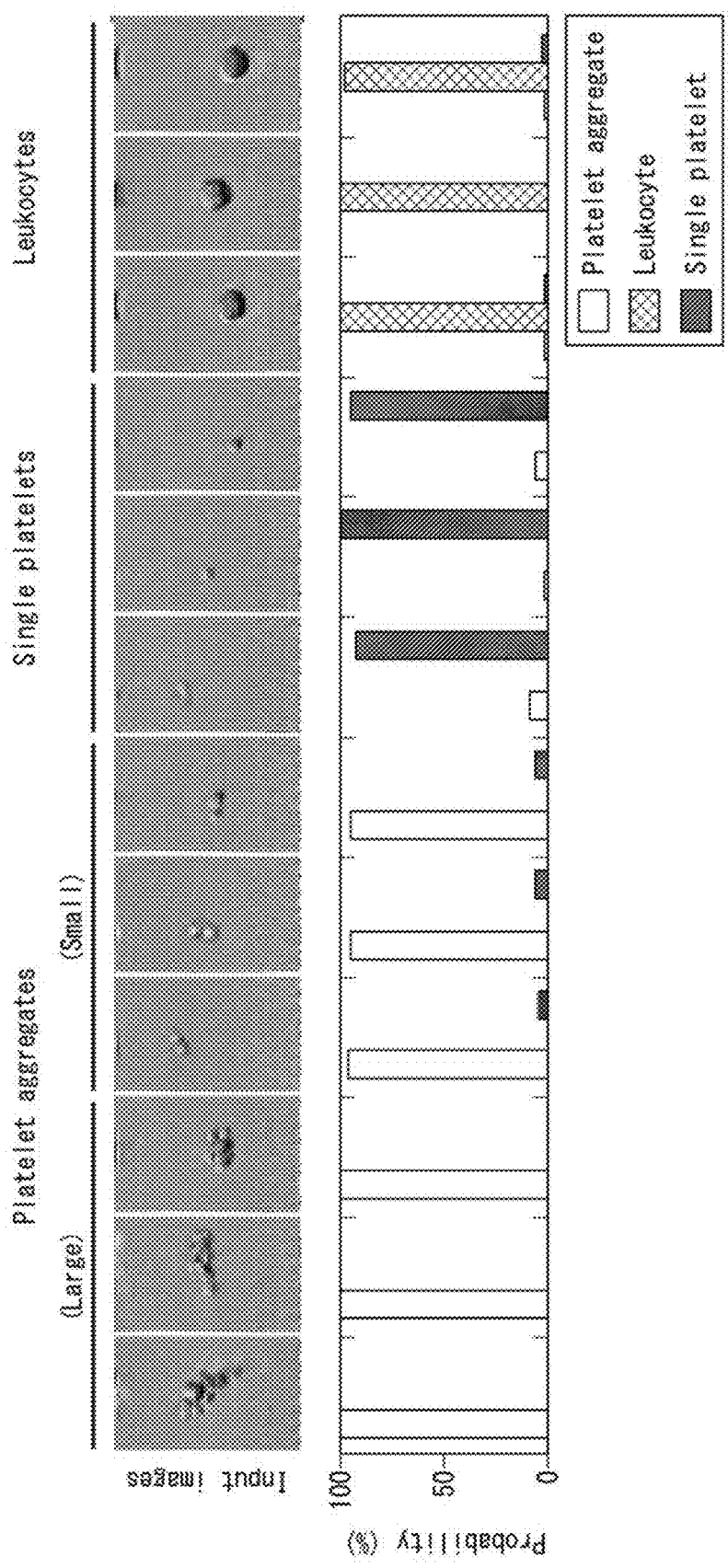
FIG. 11 is a diagram showing an example relationship between a cell image and a probability for each class.

FIG. 11 is a diagram showing an example of a relationship between cell images and the probabilities PR for all of the classes CL.

Figure 12:
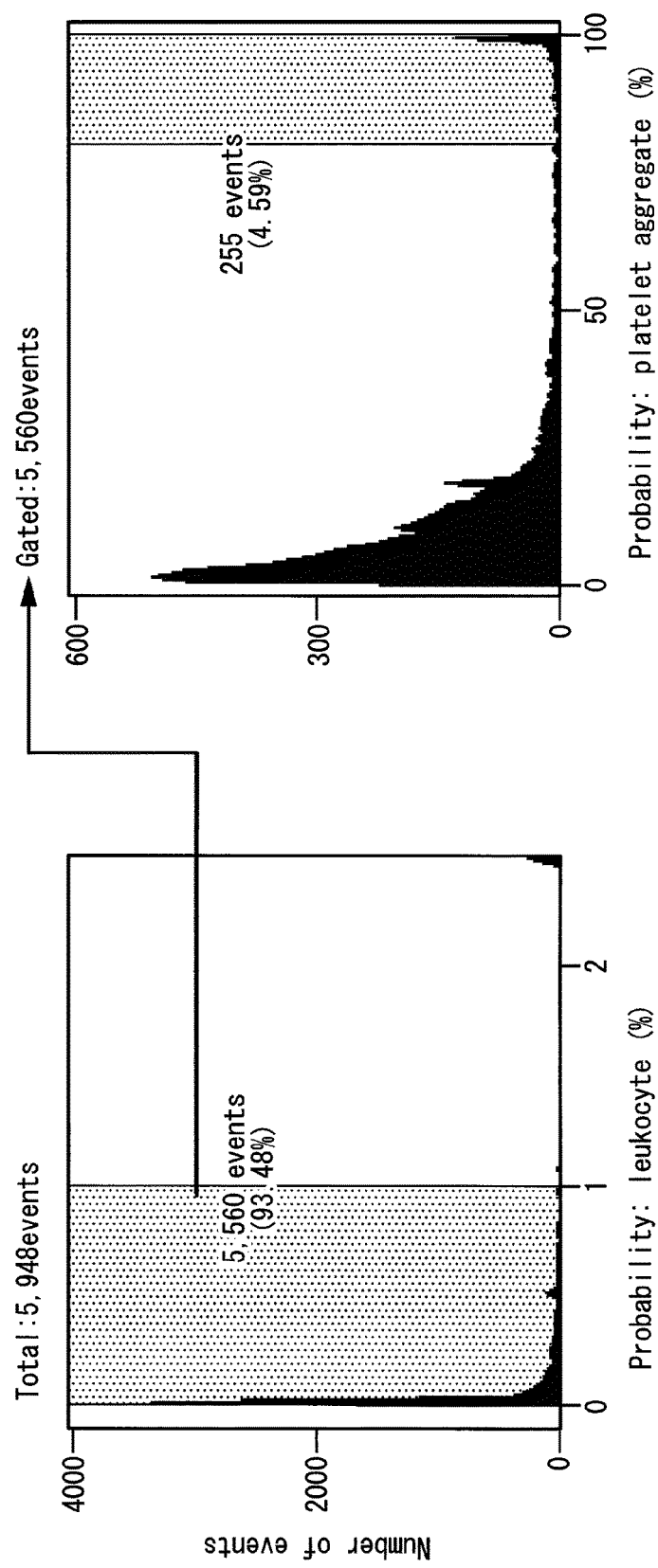
FIG. 12 is a diagram showing example histograms of probabilities and the gating results.

FIG. 12 is a diagram showing an example of histograms of probabilities PR and gating results.

In the example shown in FIG. 12, the histogram shows the distribution of probabilities PR of each image being classified into a leukocyte LK. In the figure, a region with the probability PR lower than a predetermined value is gated. In other words, cells (or tissues) with low likelihood of being leukocyte LK are gated. As a result of this gating, cells (or tissue) other than leukocyte LK are extracted. In this example, as a result of the gating, cells (or tissue) including platelet aggregates PA are extracted. Then, for the population obtained as a result of the gating, a graph G on the X-axis indicating the probability PR for the platelet aggregate PA is displayed, and a region with high likelihoods of cells being a platelet aggregate PA is gated. The number and the ratio of cells (or tissue) included in the gate are displayed near the gate. The display of the statistical values indicating the gating results enables quantitative recognition of the classification results and is thus effective.

The gating process extracts the input images IP having a high likelihood of being images of platelet aggregates PA from all input images IP. Specifically, input images IP having a low degree of matching to leukocyte LK are first selected. Then, a histogram showing the probabilities PR belonging to the platelet aggregate PA is drawn for the selected population of input images IP, and a population of input images IP having a probability PR higher than a predetermined value are specified by a gate.

Figure 13:
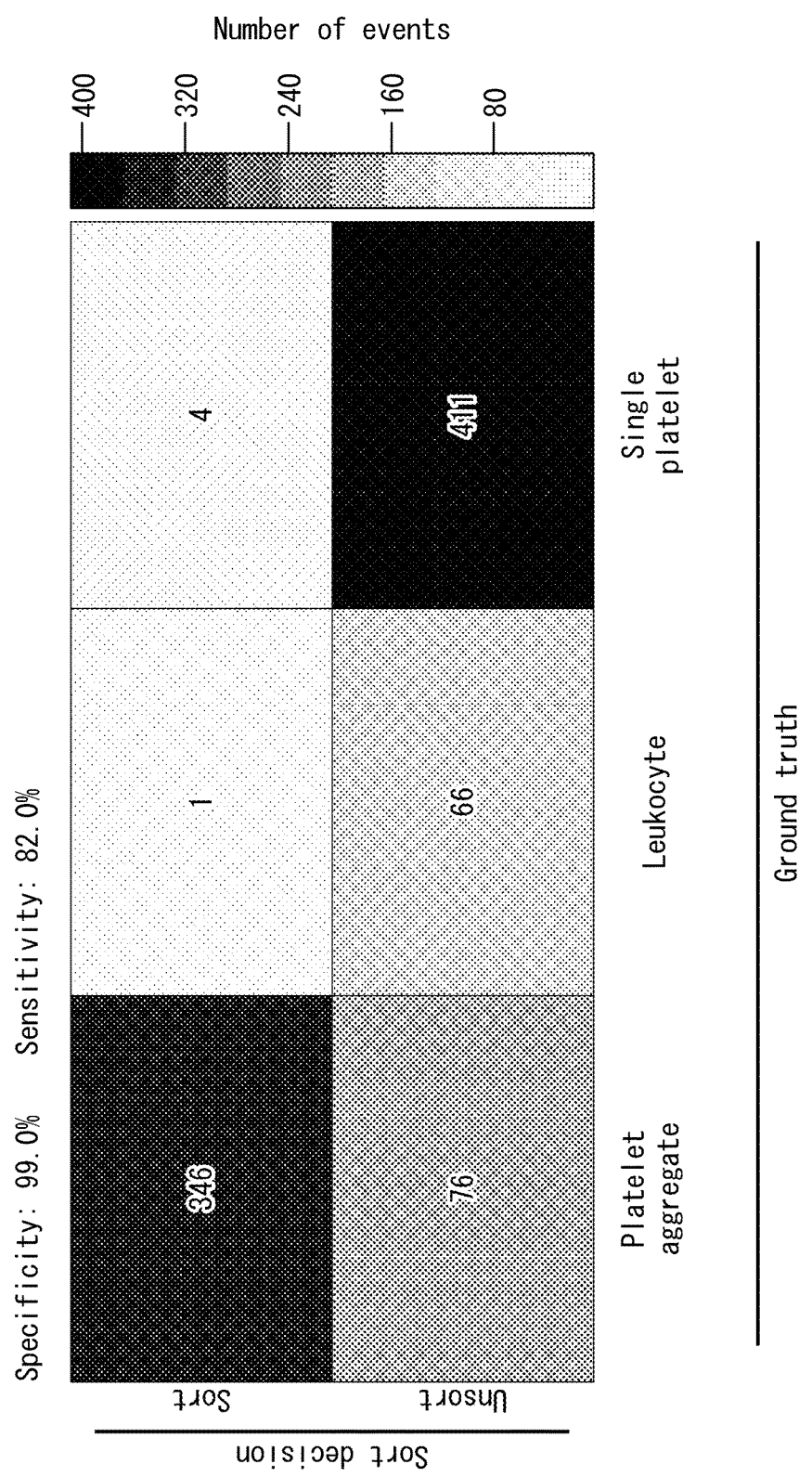
FIG. 13 is a diagram showing example measurement results of the accuracy of classification into a platelet aggregate.

FIG. 13 is a diagram showing an example of the results of quantifying the accuracy of the classification of platelet aggregates PA. This example shows the results of quantifying the accuracy of the classification of platelet aggregates PA by the gating shown in FIG. 12, using an artificially pre-classified dataset.

Figure 14:
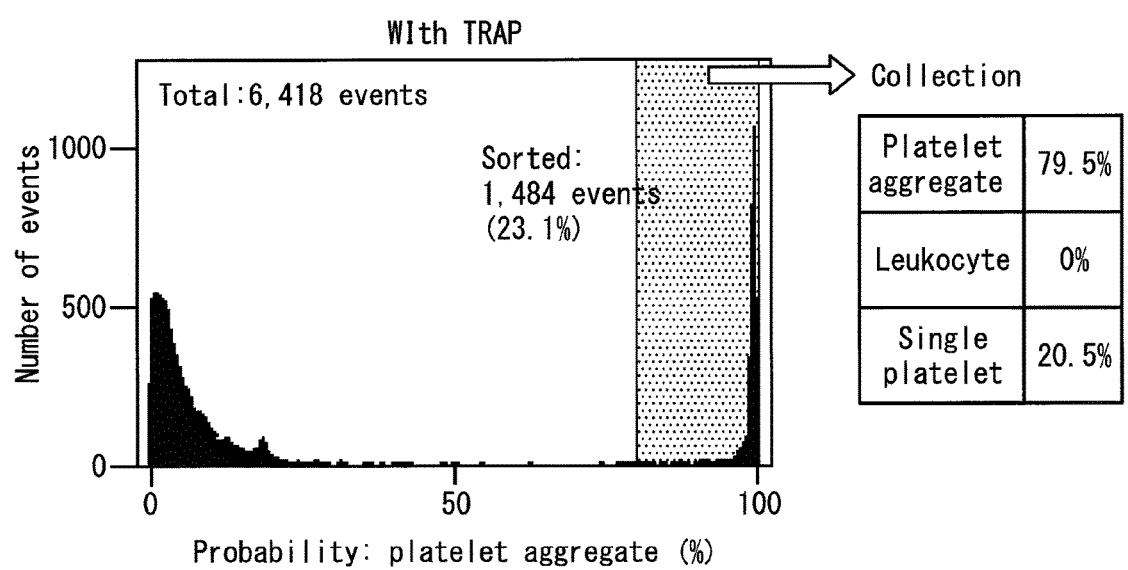
FIG. 14 is a diagram illustrating the sorting performance of a cell sorter (with a stimulus from TRAP).

FIG. 14 is a diagram illustrating an example of sorting performance by a cell sorter (with stimulation by thrombin receptor agonist peptide, or TRAP).

Figure 15:
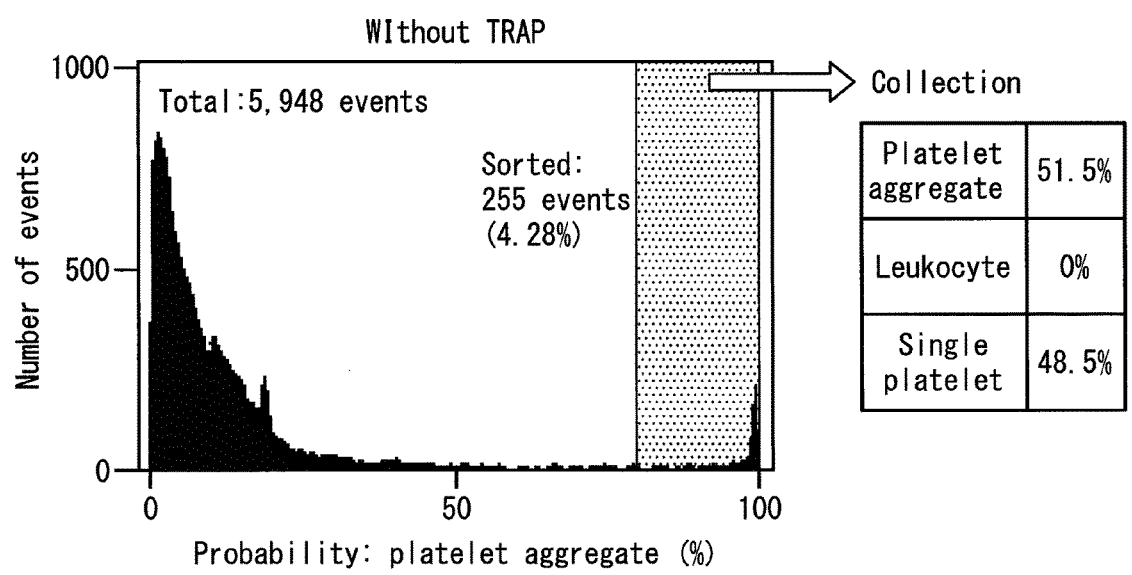
FIG. 15 is a diagram illustrating the sorting performance of the cell sorter (without a stimulus from thrombin receptor agonist peptide, or TRAP).

FIG. 15 is a diagram illustrating an example of sorting performance by a cell sorter (without stimulation by TRAP).

FIGS. 14 and 15 show examples of experiments in which a cell group to be sorted by a cell sorter (not shown) was specified using the gate shown in FIG. 12, cell sorting was performed in accordance with the gate setting, and the sorted samples were checked under a microscope to confirm the sorting performance. The comparison between the histograms shown in FIGS. 14 and 15 indicates that platelet aggregates are increased with the stimulation by TRAP. Furthermore, cell sorting with the cell sorter based on a set algorithm showed that platelet aggregates were enriched.

Figure 16A:
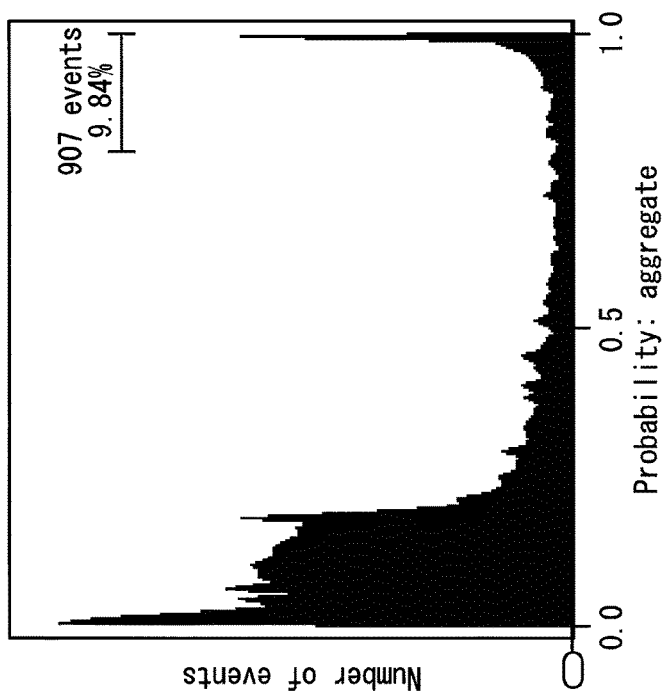
FIGS. 16A and 16B are diagrams showing display examples of histograms of probabilities for classification into a platelet aggregate.
Figure 16B:
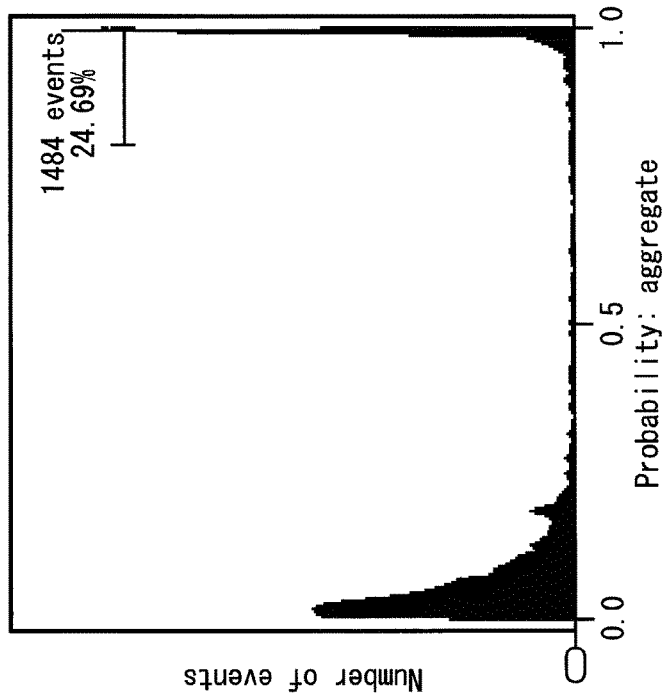
Figure 17:
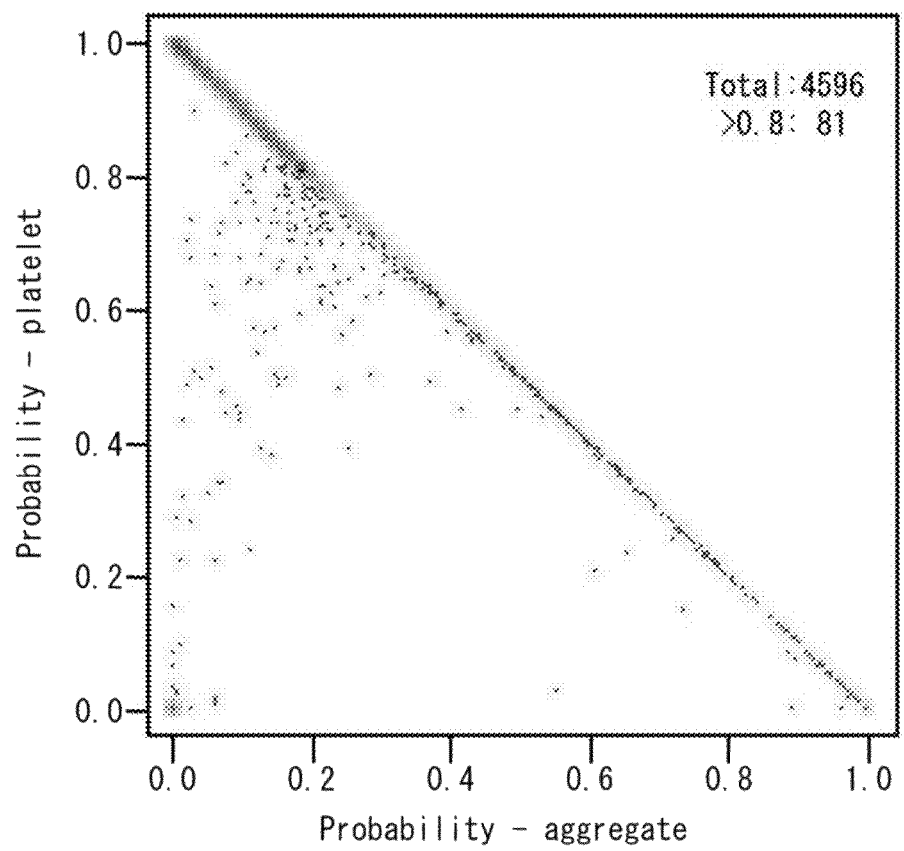
FIG. 17 is a graph in a scatter diagram.

FIGS. 16A and 16B are diagrams showing examples of the appearance of histograms of probabilities PR classified as a platelet aggregate PA. In the example shown in FIG. 16A, populations are concentrated at two ends of the histogram. In contrast, more populations are located in the middle region of the histogram in the example shown in FIG. 16B. When the classification is performed with high accuracy, populations are expected to be concentrated near the two ends of the histogram. Therefore, when the middle region includes many images as in FIG. 16B, the quality of classification is not high. In this manner, the present invention enables information about the accuracy and the precision of classification to be obtained. FIG. 17 is an example of graph G in a scatter diagram. FIG. 17 is an example of a scatter diagram with the horizontal axis (X-axis) indicating the probability PR for platelet aggregates PA and the vertical axis (Y-axis) indicating the probability PR for single-platelets (platelet SP). The graph G may be displayed as a multidimensional plot in this manner.

Figure 18A:
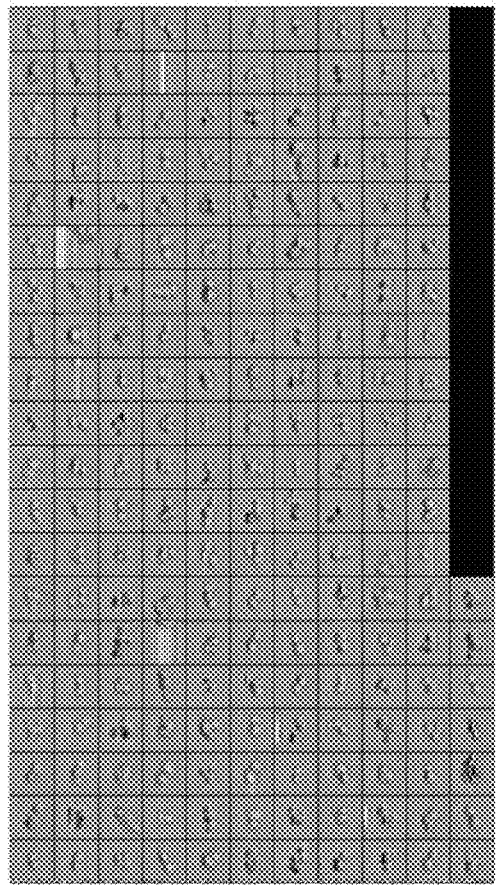
FIGS. 18A to 18C are diagrams showing example results of classification of input images by probability.
Figure 18B:
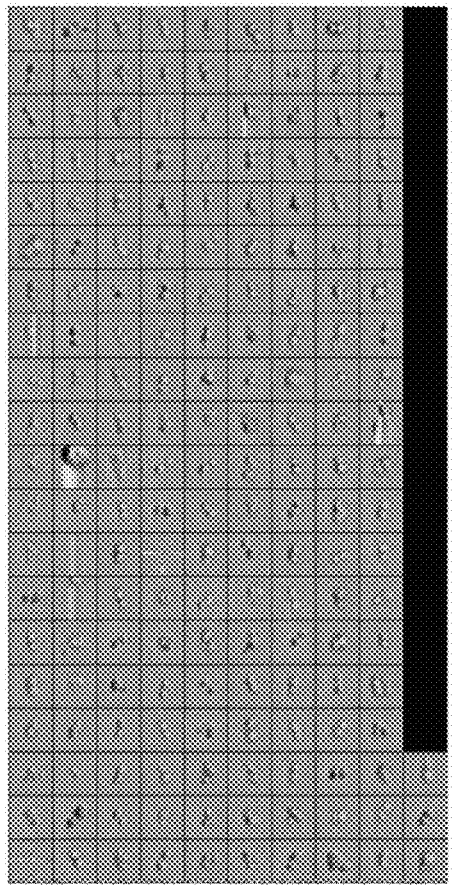
Figure 18C:
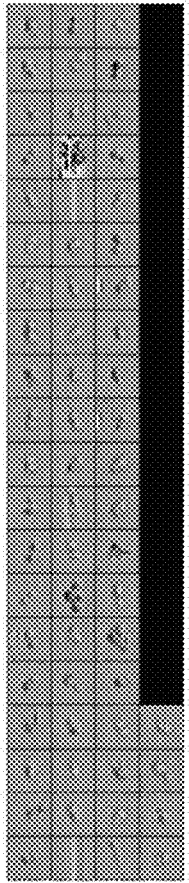

FIGS. 18A to 18C are diagrams showing an example of classifying of the input images IP by the probability PR. Specifically, a plurality of different ranges of gates were defined on a histogram of the probability of platelet aggregate PA, and some of the input images IP included in each gate were listed. In more detail. FIG. 18A shows a group of input images IP each having a probability higher than 0.999. FIG. 18B shows input images IP each having a probability from 0.99 to 0.999. FIG. 18C shows input images IP each having a probability from 0.98 to 0.99.

In this way, by changing the gate settings on the histogram, it is possible to narrow down the group of input images IP to be classified.

Although the classifier 220 is implemented using the neural network CNN in the above-described embodiments and variations, the classifier 220 is not limited to this model.

The classifier 220 may be implemented by existing techniques such as decision tree learning, support vector machines, clustering. Bayesian networks, Hidden Markov Models, ensemble learning, or boosting.

Although the embodiments of the present invention have been described in detail with reference to the drawings, the specific structures are not limited to the above embodiments and may be modified as appropriate without departing from the intent of the present invention.

Each of the above-described devices has a computer inside. Each process in each device may be implemented by the computer reading and executing a program stored in a computer-readable recording medium. The computer-readable recording medium herein refers to a magnetic disk, a magneto-optical disk, a compact disc read-only memory (CD-ROM), a digital versatile disc read-only memory (DVD-ROM), or a semiconductor memory. The computer may receive the computer program distributed through a communication line and execute the program.

The program may partially implement the above-described functions. The program may be a difference file (program) that can implement the above-described functions in combination with a program prestored in a computer system.

REFERENCE SIGNS LIST 1 classification system
10 display control device
110 probability obtainer
120 display controller
130 setting obtainer
20 classification device
210 image obtainer
220 classifier
230 probability output unit
PR probability
IP input image IP
PG probability graph image

The invention claimed is:
1. A display control device, comprising:
a memory storing computer program instructions;
a processor;
a probability calculator executed by the processor to calculate, for each of classification target classes, a probability of correctness of a class classification result of analysis of an input image using an artificial neural network that utilizes a model;
a probability frequency obtainer executed by the processor to obtain a frequency distribution of probabilities calculated by the probability calculator for each of the classification target classes;
a display controller executed by the processor to display a humanly recognizable, graphical indication of the frequency distributions of probabilities obtained by the probability obtainer for a plurality of input images using each of two or more display axes of a graph as a probability axis to indicate the probabilities of correctness, the graphical indication of said frequency distributions of probabilities being indicative of the ability of the model to produce correct classification results; and
a setting value obtainer executed by the processor to obtain a set value for a gate for a probability of correctness displayed on the graph,
wherein the display controller displays, on the graph, a gate image showing the gate based on the set value obtained by the setting value obtainer.

2. The display control device according to claim 1, wherein the display controller uses, as the probability axis, an axis indicating a combination probability obtained by combining probabilities of correctness for a plurality of classes indicated by the classification result.

3. The display control device according to claim 1, further comprising a gate judge executed by the processor to determine whether an input image is within the set value for the gate based on the set value for the gate obtained by the setting value obtainer.

4. A display control device, comprising:
a memory storing computer program instructions;
a processor;
a probability calculator executed by the processor to calculate, for each of classification target classes, a probability of correctness of a class classification result of analysis of an input image using an artificial neural network that utilizes a model;
a probability frequency obtainer executed by the processor to obtain a frequency distribution of probabilities calculated by the probability calculator for each of the classification target classes;
a display controller executed by the processor to display a humanly recognizable, graphical indication of the frequency distributions of probabilities obtained by the probability obtainer for a plurality of input images using an axis of a graph indicating a combination probability obtained by combining probabilities of correctness for a plurality of classes indicated by the classification result as a probability axis to indicate the probabilities of correctness, the graphical indication of said frequency distributions of probabilities being indicative of the ability of the model to produce correct classification results;
a setting value obtainer executed by the processor to obtain a set value for a gate for a probability of correctness displayed on the graph,
wherein the display controller displays, on the graph, a gate image showing the gate based on the set value obtained by the setting value obtainer.

5. The display control device according to claim 4, further comprising:
a gate judge executed by the processor to determine whether an input image is within the set value for the gate based on the set value for the gate obtained by the setting value obtainer.

6. A display control method, comprising:
calculating, for each of classification target classes, a probability of correctness of a class classification result of analysis of an input image using an artificial neural network that utilizes a model;
obtaining a frequency distribution of probabilities for each of the classification target classes;
displaying a humanly recognizable, graphical indication of the frequency distribution of probabilities obtained for a plurality of input images using each of two or more display axes of a graph as a probability axis to indicate the probabilities of correctness, the graphical indication of said frequency distributions of probabilities being indicative of the ability of the model to produce correct classification results;
obtaining a set value for a gate for a probability of correctness to be displayed on the graph; and
displaying, on the graph, a gate image showing the gate based on the set value.

7. The display control method according to claim 6, further comprising: with a gate judge, determining whether to perform retraining or determining a retraining method based on the probability of correctness of the classification result.

8. The display control method according to claim 6, further comprising: with a gate judge, determining whether to perform retraining or determining a retraining method based on the probability of correctness of the classification result.

9. A non-transitory computer-readable storage medium embodying a computer program that, when executed, causes a computer included in a display control device to perform:
calculating, for each of classification target classes, a probability of correctness of a class classification result of analysis of an input image using an artificial neural network that utilizes a model;
obtaining a frequency distribution of probabilities for each of the classification target classes;
displaying a humanly recognizable, graphical indication of the frequency distribution of probabilities obtained for a plurality of input images using each of two or more display axes of a graph as a probability axis to indicate the probabilities of correctness, the graphical indication of said frequency distributions of probabilities being indicative of the ability of the model to produce correct classification results;
obtaining a set value for a gate for a probability of correctness to be displayed on the graph; and
displaying, on the graph, a gate image showing the gate based on the set value.

10. A display control method, comprising:
calculating, for each of classification target classes, a probability of correctness of a class classification result of analysis of an input image using an artificial neural network that utilizes a model;
obtaining a frequency distribution of probabilities for each of the classification target classes;
displaying a humanly recognizable, graphical indication of the frequency distribution of probabilities obtained for a plurality of input images using an axis of a graph indicating a combination probability obtained by combining probabilities of correctness for a plurality of classes indicated by the classification result as a probability axis to indicate the probabilities of correctness, the graphical indication of said frequency distributions of probabilities being indicative of the ability of the model to produce correct classification results;

obtaining a set value for a gate for a probability of correctness to be displayed on the graph; and displaying, on the graph, a gate image showing the gate based on the set value.

11. A non-transitory computer-readable storage medium embodying a computer program that, when executed, causes a computer included in a display control device to perform:

calculating, for each of classification target classes, a probability of correctness of a class classification result of analysis of an input image using an artificial neural network that utilizes a model;

obtaining a frequency distribution of probabilities for each of the classification target classes;

displaying a humanly recognizable, graphical indication of the frequency distribution of probabilities obtained for a plurality of input images using an axis of a graph indicating a combination probability obtained by combining probabilities of correctness for a plurality of classes indicated by the classification result as a probability axis to indicate the probabilities of correctness, the graphical indication of said frequency distributions of probabilities being indicative of the ability of the model to produce correct classification results;

obtaining a set value for a gate for a probability of correctness to be displayed on the graph; and displaying, on the graph, a gate image showing the gate based on the set value.

* * * * *